(12) United States Patent
Grass et al.

(10) Patent No.: US 7,889,857 B2
(45) Date of Patent: Feb. 15, 2011

(54) METHOD AND SYSTEM FOR PROVIDING A SERVICE

(75) Inventors: Norbert Grass, Herzogenaurach (DE); Theodor Rosch, Oberotterbach (DE); Klaus Ruiner, Hainburg (DE); Matthias Seifert, Buchholz (DE); Gerhard Weller, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1067 days.

(21) Appl. No.: 11/058,523

(22) Filed: Feb. 15, 2005

(65) Prior Publication Data

US 2006/0182261 A1    Aug. 17, 2006

(51) Int. Cl.
*H04M 3/00* (2006.01)

(52) U.S. Cl. .............................. 379/265.12; 379/265.09

(58) Field of Classification Search ............ 379/100.05, 379/110.01, 265.12, 265.01–266.1; 705/9, 705/8, 7; 348/14.1; 706/13; 709/202; 726/10; 455/414.2
See application file for complete search history.

(56) References Cited

U.S. PATENT DOCUMENTS

| | | | | |
|---|---|---|---|---|
| 5,347,306 A * | 9/1994 | Nitta | ........................ | 348/14.1 |
| 5,467,268 A * | 11/1995 | Sisley et al. | ..................... | 705/9 |
| 5,682,421 A * | 10/1997 | Glovitz et al. | .......... | 379/100.05 |
| 5,737,728 A * | 4/1998 | Sisley et al. | ..................... | 705/8 |
| 5,848,403 A * | 12/1998 | Gabriner et al. | ............... | 706/13 |
| 5,884,029 A * | 3/1999 | Brush et al. | .................. | 709/202 |
| 5,920,846 A * | 7/1999 | Storch et al. | ................... | 705/7 |
| 5,933,479 A * | 8/1999 | Michael et al. | ........ | 379/110.01 |
| 5,943,652 A * | 8/1999 | Sisley et al. | ..................... | 705/9 |
| 6,070,142 A * | 5/2000 | McDonough et al. | .......... | 705/7 |
| 6,279,112 B1 * | 8/2001 | O'Toole et al. | ............... | 726/10 |
| 6,321,091 B1 * | 11/2001 | Holland | ................... | 455/414.2 |
| 6,401,122 B1 * | 6/2002 | Matsui et al. | ............... | 709/227 |
| 6,868,441 B2 * | 3/2005 | Greene et al. | ............... | 709/220 |
| 7,184,540 B2 * | 2/2007 | Dezonno et al. | ....... | 379/265.02 |
| 7,248,677 B2 * | 7/2007 | Randall et al. | ........... | 379/93.23 |
| 2002/0010615 A1 * | 1/2002 | Jacobs | .......................... | 705/9 |
| 2002/0038232 A1 * | 3/2002 | Nihira | ......................... | 705/8 |
| 2002/0113809 A1 * | 8/2002 | Akazawa et al. | ............ | 345/706 |
| 2002/0147611 A1 * | 10/2002 | Greene et al. | .................. | 705/1 |
| 2003/0004774 A1 * | 1/2003 | Greene et al. | .................. | 705/8 |
| 2003/0041032 A1 * | 2/2003 | Ballin et al. | ................. | 705/51 |
| 2003/0069797 A1 * | 4/2003 | Harrison | ..................... | 705/26 |
| 2004/0117046 A1 * | 6/2004 | Colle et al. | ................... | 700/99 |
| 2004/0133889 A1 * | 7/2004 | Colle et al. | ................. | 718/100 |
| 2005/0060218 A1 * | 3/2005 | Coutts et al. | ................... | 705/9 |

* cited by examiner

*Primary Examiner*—Simon Sing

(57) ABSTRACT

A method and system for providing a customer with a service upon a service request. The method includes retrieving a dataset from a database for identifying a qualified service person using information about the service, the service person and a customer; establishing communication with the customer; and providing the customer with the service. After the service is performed, the retrieved dataset is updated to maintain accurate information stored in the database.

9 Claims, 3 Drawing Sheets

METHOD AND SYSTEM FOR PROVIDING A SERVICE

FIELD OF THE INVENTION

The present invention relates to a method and a system for providing a service.

BACKGROUND OF THE INVENTION

For many customers, purchasing sophisticated technical equipment like production machinery, industrial plants, turbines, generators, passenger trains, vehicles, home entertainment devices and many more, an important aspect of their purchase decision is the availability of a reliable, efficient and cost-effective after-sales service. Modern technology often requires highly specialized and educated service providers. So more and more manufacturers put much effort in offering after-sales services and many independent service providers are competing with them.

When a customer's technical equipment needs service, he or she usually requests a service activity, for example a regular maintenance procedure, from a service provider. There is often more than one service provider available, and there are several aspects which influence the customer's choice.

SUMMARY OF THE INVENTION

First of all, the qualification of the service provider to provide the requested service activity is very important. Furthermore, a fast and efficient service is required. Much like a client-counselor relationship, many customers tend to appreciate a kind of lasting personal relationship with "their" personal service providers. Such a personal service provider is familiar with the customer's facilities and therefore ensures a quick and effective response to a service activity request.

On the other hand, the availability of a specific service person's response to a service activity request cannot always be assured. So another person has to take over the task often resulting in a longer processing time, because the other person is usually not as familiar with the customer's facilities as the specific service person, who has already provided the service or a similar service activity to the customer in the past. So valuable context knowledge already gained by the specific service person in the past regarding the customer's facilities is not available for speeding up the service activity provided by the other service person. This is especially true if, for example, a repeated service is requested regarding the same error correction of a technical system with the service persons being different each time.

It is therefore an object of the invention to provide a simple and effective method of providing a service.

One aspect of the invention thus involves a concept of setting up a database including information on qualified service persons and associated services.

The datasets of the database reflect the pool of service personnel from which a service provider can choose upon a service request received from a customer in order to appoint an appropriate service person to provide the customer with the service.

A further aspect provides for updating the retrieved dataset after providing the service to the customer, so that a future service request is always matched to an accurate, up-to-date database ensuring high service quality.

Another aspect of the invention includes using additional information about customers to whom a service person has already provided the requested service as a basis for choosing the service person from the pool of service persons.

Other aspects of the invention relate to technical supporting means like computer connections, tracking systems or pagers to track the qualified service person and establish communication between the customer and the service person.

Yet another advantageous aspect of the invention relates to using a further person for performing the service at the customer's facilities with the identified service person residing at a remote service center and instructing the further person on how to perform the service in detail using telecommunication means such as audio and/or video communication.

Further aspects relate to utilizing an artificial image or model of a human person or other creature as part of a Human-Machine-Interface (HMI). Such an artificial image or model is commonly referred to as an avatar. The avatar is displayed on the customer's computer screen when establishing communication between the identified service person and the customer. It is, for example, possible to assign a specific avatar to each individual customer so that each customer is always facing the same, familiar (even though artificial) person when requesting a service and the communication is established. In that case, the service person actually providing the service may not always be the same person but the avatar will always be the same "person" contacting the customer. The choice of the actual human service person can therefore be made solely on the basis of hard facts such as qualification, availability, response time and so on and need not include soft factors such as a (personal) relationship to the customer as the customer may not recognize the human acting behind the avatar's appearance. A consistent appearance of the same avatar to face the customer can be nearly as effective in establishing kind of a personal relationship and confidence between the customer and the service provider as the actual direct interaction between two human partners.

A further aspect of the present invention involves a system for providing a service including technical units implementing the steps outlined in the method according to the invention and its preferred embodiments.

Further aspects, features and advantages of the present invention will become apparent from the drawings and detailed description of the following preferred embodiments.

BRIEF DESCRIPTION OF THE DRAWINGS

The above-mentioned and other concepts of the present invention will now be addressed with reference to the drawings of the preferred embodiments of the present invention. The shown embodiments are intended to illustrate, but not to limit the invention. The drawings contain the following figures, in which like numbers refer to like parts throughout the description and drawings and wherein.

DETAILED DESCRIPTION OF THE PREFERRED EMBODIMENT

Overview

Figure 1:
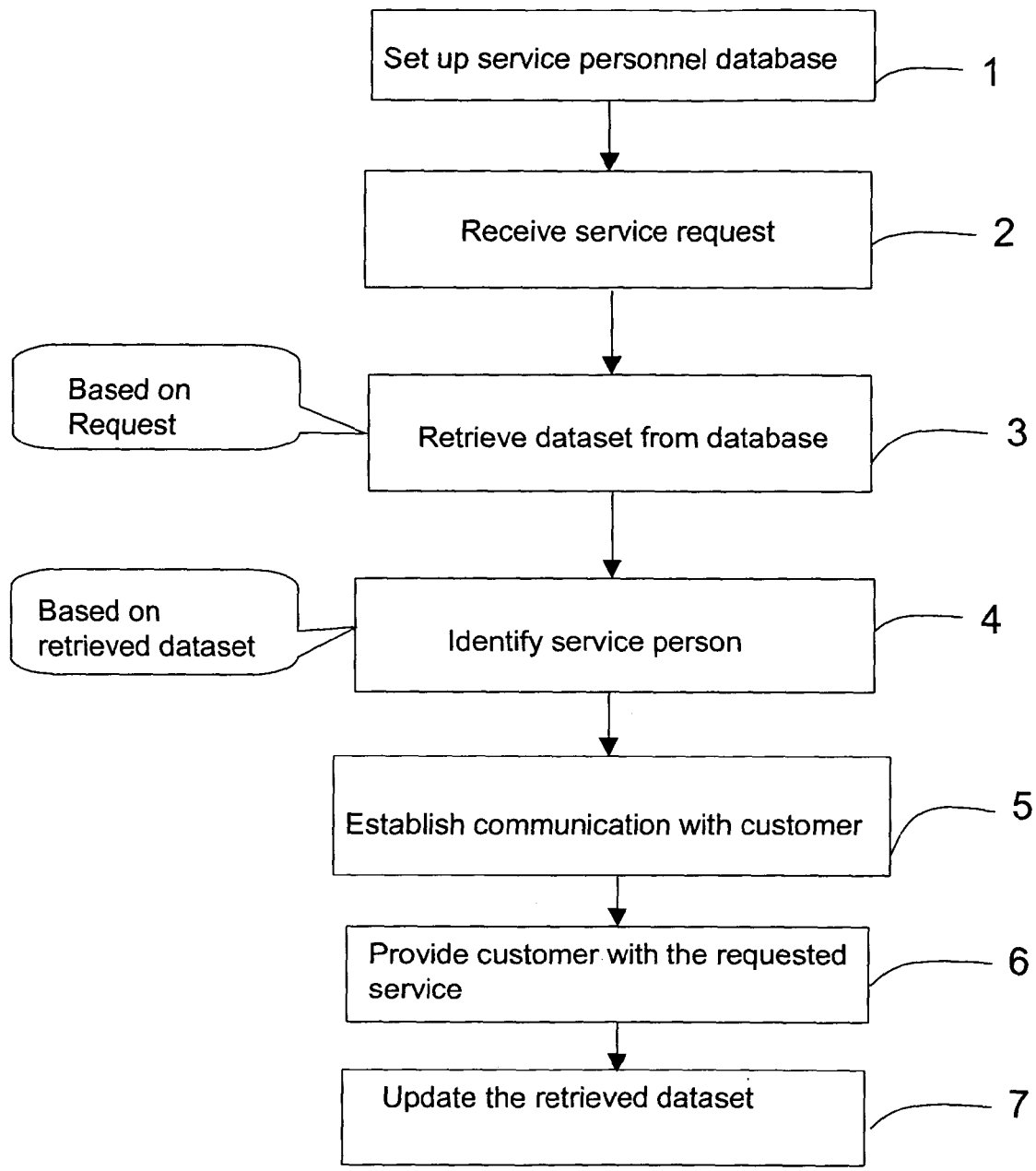
FIG. 1 is a flowchart of an exemplary process of the present invention showing an exemplary series of steps of providing a customer with a service.

The disclosed invention advantageously employs one or more base concepts.

It basically provides an efficient and simple method of providing a customer with a service upon a service request.

The service may include any kind of services, for example regular maintenance, emergency repair, delivery and installation of spare parts, optimization, operation etc. But also non-technical services shall be covered by the term "service" such as entertainment, medical diagnosis and treatment, delivery of ordered items like food and/or consumer goods.

Preferably, the customer's technical facility comprises at least one computer and that computer can be provided with the service online using an internet connection. In such case, the service can for example include software error handling, updating, optimizing and installation of software programs.

One concept is setting up a service-personnel related database including qualification information.

Another concept involves matching a service request with a dataset of the database using service-related, personnel-related and customer-related information.

Many customers tend to establish a trustful relationship with a service person whom they already know and whom they can rely on. So besides aiming at an efficient, qualification-related response to the service request, identifying the service person also takes into consideration former ties of the service person to the customer requesting the service, such as former service activities already performed at the customer's facilities, type of those activities, success in providing those activities, context knowledge derivable from those activities and so on.

After providing the service activity, the dataset of the identified service person is updated, at least with regard to the information regarding the service activity or the information regarding the service person's qualification, so that in connection with a future service request of the same or similar kind, the service person's chances of being selected from the database increase and so do the chances of a successful and efficient completion of a subsequent service request.

Yet another concept provides establishing communication between the customer and the identified service person.

Therein the communication may involve a further service person locally present at the customer's facility. The further service person acts as a communication interface being instructed to provide the service by the identified service person, who is present at a remote location such as a remote service center. Communication is preferably established using telecommunication technology such as a landline or mobile telephone, a video phone or the internet.

A further preferred concept includes utilizing an avatar displayed at the customer's computer terminal when establishing and maintaining the communication. The avatar serves the purpose of presenting a "familiar face" to the customer for creating a pleasant communication atmosphere, whereas the human service person actually providing the service (either remotely or locally) need not be known to the customer and can be selected solely based on qualification and/or efficiency aspects without taking into consideration former ties to the customer or similar information.

All the embodiments to be described in more detail in the following can be applied to providing technical and non-technical services to all kinds of customers. The services preferably include technical activities performed on facilities such as industrial plants, hotels, production machinery, turbines, generators, passenger trains, vehicles, home entertainment devices, but shall not be limited to any special purpose.

FIG. 1 depicts a flowchart of an exemplary process of the present invention showing an exemplary series of steps of providing a customer with a service.

Step 1 involves setting up a service personnel database.

The database includes datasets each comprising information about at least one service person qualified to perform at least one service activity, information regarding the service activity and information relating to the customer.

For example, the customer-related information may include former service activities of the same or similar kind already provided to the requesting customer and a related service success by the service person. Thus, not only qualification as a neutral fact but also "service history" as a customer-related criterion can be taken into consideration when retrieving datasets from the database.

Step 2 depicts receiving a service request from a customer, for example by telephone or over the internet.

In Step 3, a dataset is retrieved from the database based on the service request. A retrieving rule can be based on any or all information included in the dataset and can involve weighing of the information, so that e.g. qualification is the more important retrieving criterion compared to service history, or vice versa.

Step 4 depicts identifying the service person included in the retrieved dataset.

Step 5 and 6 provide establishing communication with the customer and providing the customer with the service by the identified service person.

Communication thereby may include remote communication using the internet or radio telecom means such as a mobile phone.

Finally, step 7 involves updating the retrieved dataset to ensure accurate information stored in the database, so that any future identification of a service person upon a future service request is very efficient and promising.

Figure 2:
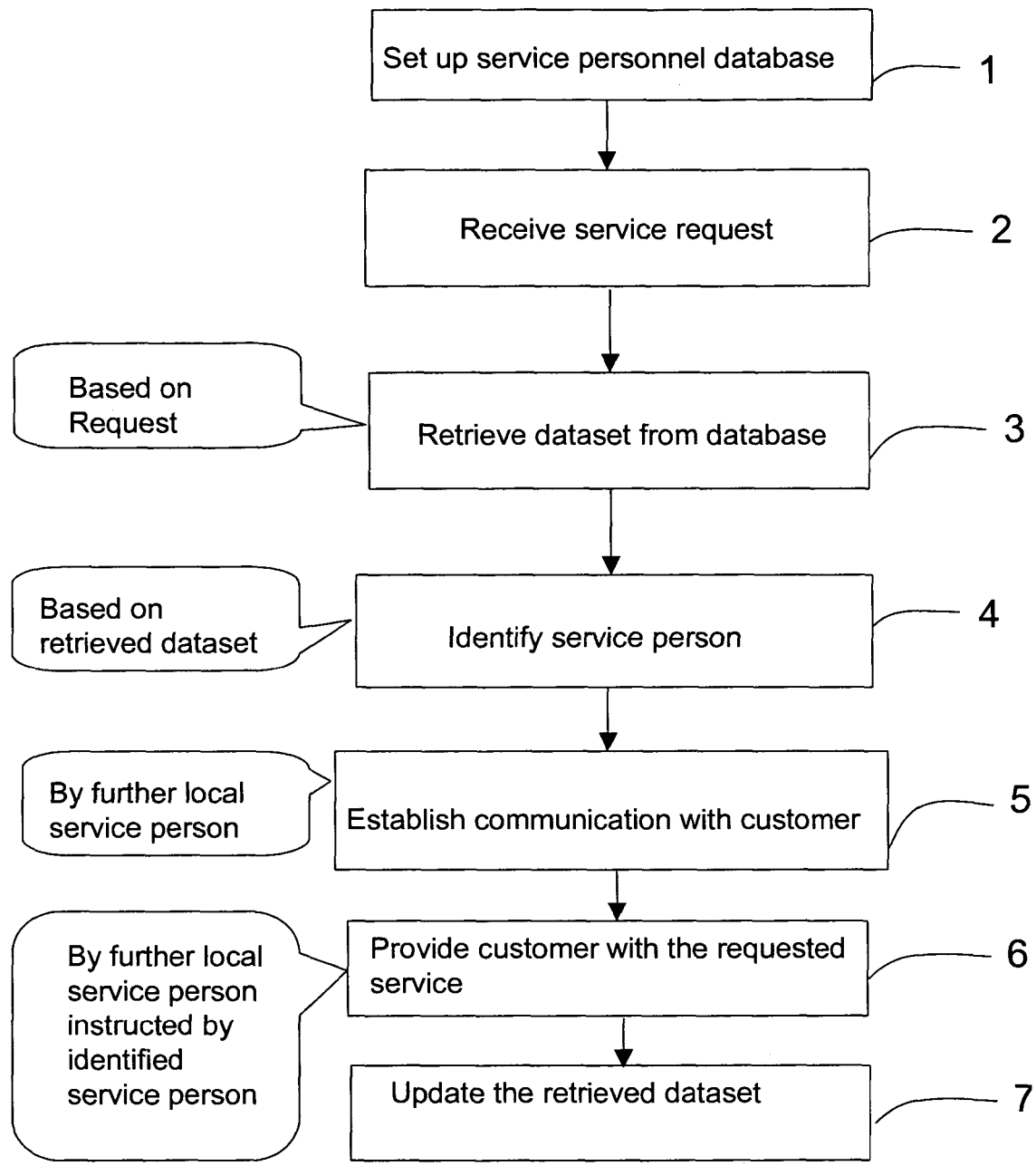
FIG. 2 is a flowchart of an alternative process of the present invention showing an exemplary series of steps of providing a customer with a service.

FIG. 2 schematically illustrates a flowchart of an alternative process of the present invention showing an exemplary series of steps of providing a customer with a service.

The basic steps 1-7 are substantially identical to the steps already shown in FIG. 1.

What is new is establishing the communication by a further service person, who is locally present at the customer's facility. Such a local, further service person acts as a intermediary communication medium between the customer and the identified service person, wherein the service is provided by the identified service person instructing the local, further service person, preferably over the phone, video phone or the internet.

The further service person is usually familiar with the customer and ensures a trustful atmosphere when communicating with the customer, whereas the identified service person ensures high quality of the provided service.

Figure 3:
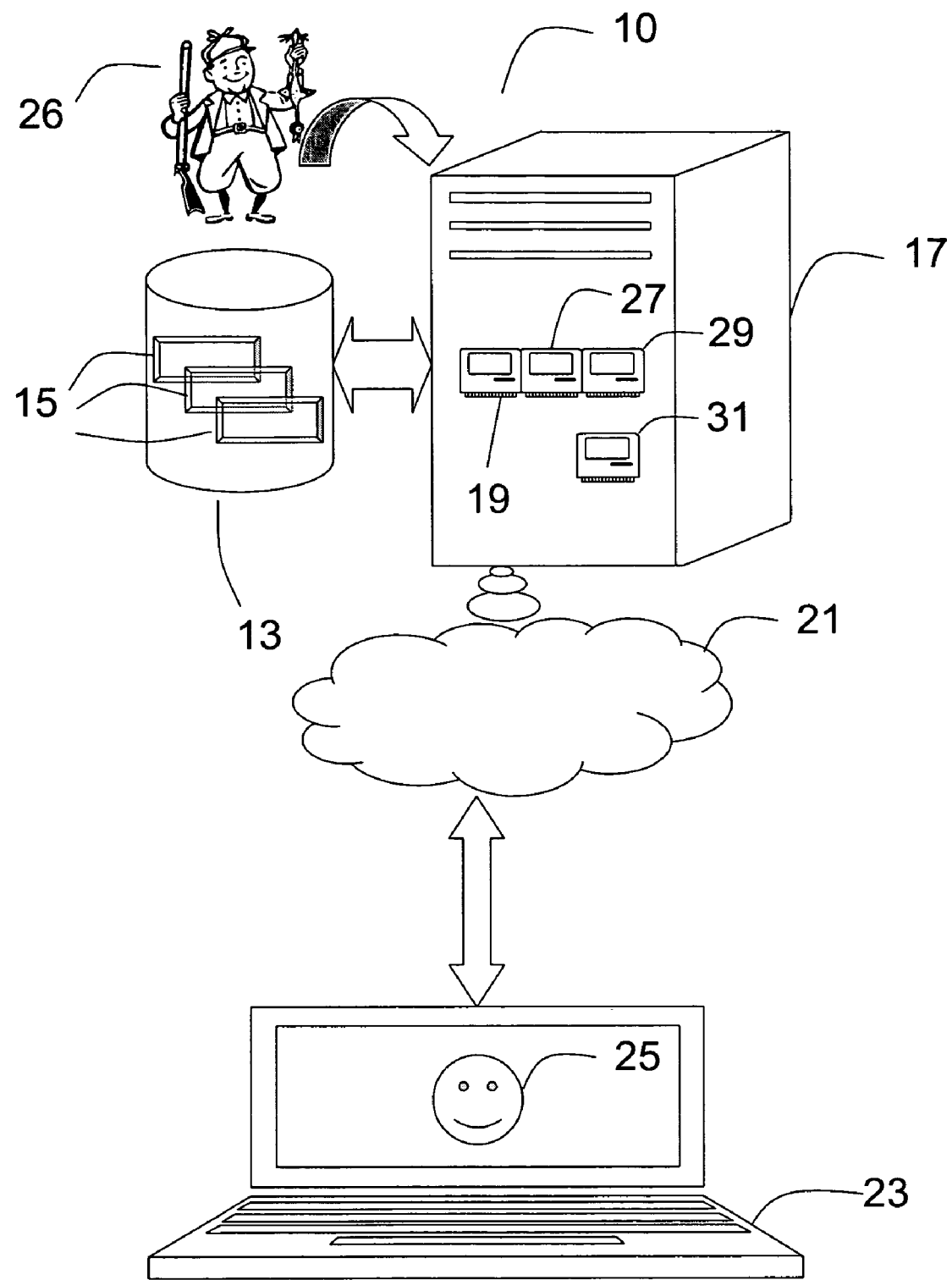
FIG. 3 is a schematic diagram of a computer system adapted to enable an embodiment of the invention.

FIG. 3 shows a schematic diagram of a computer system adapted to enable an embodiment of the invention.

The system 10 includes a computer terminal 17 connected to a database 13, which comprises a plurality of datasets 15.

The datasets 15 include information on a plurality of service persons with regard to their qualification to provide a service, the service itself and customer-related information such as a "service history" of the service person.

A client uses a client terminal 23 to issue a service request to the service provider over the internet 21, for example by E-mail. The service request is received by an input device 19, for example an Email mailbox or a website. An evaluation device 27 retrieves a dataset 15 from the database 13, identifying at least one specific service person 26. Retrieving the dataset 15 can be based on any or all information included in the datasets 15, wherein the information can be weighted, emphasizing either qualification or service history of the service person.

Communication with the customer is established using a control device 29, for example a software program enabling a virtual meeting session on the internet.

The service provider is visually represented by an avatar 25 displayed on the client terminal 23. The avatar 25 can be a live or a recorded image and can further be animated and include voice output. Preferably, the avatar 25 is adapted to the customer requesting the service, so that different customers each have their "personal avatar" as part of the Human-Machine-Interface between the service provider and the customer.

The actual person providing the service is the identified service person 26, who may be at a remote location, even with regard to the service provider's location, and dispose of an internet access device such as a laptop and software tools to provide the customer with the requested service (e.g. software debugging, update or installation) using the internet.

After the identified service person 26 has provided the service, the database 13 is updated with regard to the dataset 13 assigned to the identified service person 26. Such an update may affect information related to the service person's 26 qualification, his or her service history, problems and success information associated with providing the service and so on.

In addition to the embodiments of the aspects of the present invention described above, those of skill in the art will be able to arrive at a variety of other arrangements and steps which, if not explicitly described in this document, nevertheless embody the principles of the invention and fall within the scope of the appended claims.

For example, the ordering of method steps is not necessarily fixed, but may be capable of being modified without departing from the scope and spirit of the present invention.

What is claimed is:

1. A method of providing a customer with a service, comprising:
    storing in a database of a service provider a number of datasets reflecting a pool of service personnel of the service provider, each dataset including: qualification data for each of the service personnel to provide a service and service history data regarding former services provided to customers by each of the service personnel;
    receiving by the service provider a service activity request from a customer via a communication device;
    retrieving by a computer terminal of the service provider connected to the database at least one dataset from the database based on the service activity request in accordance with a retrieving rule that weighs qualification data and service history data for each service personnel so that the customer can be matched with an appropriate service personnel;
    identifying the appropriate service personnel in the retrieved dataset;
    establishing communication between the service provider and the customer utilizing a virtual meeting session comprising a personal avatar for the customer to interface with, the avatar transmitted from the service provider to a computer of the customer wherein an appearance of the avatar is specifically adapted and assigned to the customer to provide the customer with a familiar and consistent appearance in its personal avatar regardless of which service personnel is identified for the service activity request or a future service activity request; and
    after providing the customer with the service activity by the service personnel based upon the service activity request, updating the retrieved dataset with information regarding the service activity.

2. The method according to claim 1, wherein a current physical location of the service personnel providing the customer with the service activity is identified using a tracking system.

3. The method according to claim 1, wherein the identified service personnel is notified using a message sent to a receiver unit assigned to the service personnel.

4. The method according to claim 1, wherein the avatar is animated.

5. The method according to claim 1, wherein the avatar includes an artificial voice.

6. The method according to claim 5, wherein the artificial voice includes voice transformation based on a digitized human voice.

7. A system enabling a provider to supply a customer with a service, comprising:
    a database of a service provider including a number of datasets reflecting a pool of service personnel of the service provider, each dataset including: qualification data for each of the service personnel to provide a service and service history data regarding former services provided to customers by each of the service personnel;
    an input device of a computer terminal of the service provider connected to the database for receiving a service activity request from a customer;
    an evaluation unit connected to the database for retrieving at least one dataset from the database based on the service activity request in accordance with a retrieving rule that weighs qualification data and service history data for each service personnel so that the customer can be matched with an appropriate service personnel and for identifying the appropriate service personnel in the retrieved dataset;
    a control device for establishing communication between the service provider and the customer utilizing a virtual meeting session comprising a personal avatar for the customer to interface with, the avatar transmitted from the service provider to a computer of the customer, wherein an appearance of the avatar is specifically adapted and assigned to the customer to provide the customer with a familiar and consistent appearance in its personal avatar regardless of which service personnel is identified for the service activity request or a future service activity request; and
    an updating device for updating the retrieved dataset after the service personnel has provided the customer with the service activity.

8. The system according to claim 7, wherein the avatar includes an artificial voice.

9. The system according to claim 8, wherein the artificial voice includes voice transformation based on a digitized human voice.

* * * * *